United States Patent
Wu et al.

(10) Patent No.: US 12,425,136 B2
(45) Date of Patent: Sep. 23, 2025

(54) DOWNLINK DATA RECEIVING METHOD, DOWNLINK DATA SENDING METHOD, AND DEVICE

(71) Applicant: VIVO MOBILE COMMUNICATION CO., LTD., Dongguan (CN)

(72) Inventors: Yumin Wu, Dongguan (CN); Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 397 days.

(21) Appl. No.: 17/956,795

(22) Filed: Sep. 29, 2022

(65) Prior Publication Data

US 2023/0027505 A1  Jan. 26, 2023

Related U.S. Application Data

(63) Continuation of application No. PCT/CN2021/085826, filed on Apr. 7, 2021.

(30) Foreign Application Priority Data

Apr. 7, 2020 (CN) .......................... 202010266874.7

(51) Int. Cl.
*H04L 1/18* (2023.01)
*H04L 1/1812* (2023.01)
(Continued)

(52) U.S. Cl.
CPC ........... *H04L 1/1812* (2013.01); *H04W 72/30* (2023.01)

(58) Field of Classification Search
CPC ....... H04W 72/005; H04W 4/06; H04W 8/26; H04W 72/30; H04L 12/189; H04L 12/185; H04L 1/1812
(Continued)

(56) References Cited

U.S. PATENT DOCUMENTS 8,654,661 B2   2/2014  Wang et al.
11,778,426 B2 * 10/2023 Zhou ................. H04W 4/06
                                                    370/312
(Continued)

FOREIGN PATENT DOCUMENTS

CN   101627570 A  *  1/2010 ........... H04L 1/1812
CN   101771950 A  *  7/2010 .............. H04W 4/06
(Continued)

OTHER PUBLICATIONS

Extended European Search Report issued in related European Application No. 21783945.5, mailed Apr. 4, 2023, 10 pages.
(Continued)

*Primary Examiner* — Peter G Solinsky
*Assistant Examiner* — Sanjay K Dewan
(74) *Attorney, Agent, or Firm* — IPX PLLC

(57) ABSTRACT

A downlink data receiving method, a downlink data sending method, and a device are provided. The downlink data receiving method includes: obtaining a Hybrid Automatic Repeat Request (HARQ) process of an Multicast and Broadcast Service (MBS) service; and receiving downlink data of the MBS service according to the HARQ process. In the embodiments of the present disclosure, a specific MBS service can be sent and retransmitted through a corresponding HARQ process, so that a terminal can combine and decode data repeatedly sent by a network side for a plurality of times.

20 Claims, 3 Drawing Sheets

(51) Int. Cl.
*H04W 72/00* (2023.01)
*H04W 72/30* (2023.01)

(58) Field of Classification Search
USPC .......................................................... 370/312
See application file for complete search history.

(56) References Cited

U.S. PATENT DOCUMENTS

| | | | |
|---|---|---|---|
| 2010/0159822 A1 | 6/2010 | Lim et al. | |
| 2010/0278093 A1* | 11/2010 | Wang | H04W 72/30 |
| | | | 370/312 |
| 2010/0296427 A1 | 11/2010 | Lohr et al. | |
| 2014/0086137 A1 | 3/2014 | Chen | |
| 2018/0042033 A1 | 2/2018 | Xu et al. | |
| 2018/0115430 A1* | 4/2018 | Seo | H04W 74/0833 |
| 2020/0260486 A1* | 8/2020 | Zhou | H04L 1/1835 |
| 2020/0382207 A1* | 12/2020 | Medles | H04L 1/1822 |
| 2022/0061076 A1* | 2/2022 | Ma | H04L 5/0055 |
| 2022/0232403 A1* | 7/2022 | Lee | H04W 24/08 |
| 2022/0330213 A1* | 10/2022 | Lee | H04L 1/1864 |
| 2023/0093727 A1* | 3/2023 | Lin | H04L 1/0061 |
| | | | 370/312 |
| 2023/0403759 A1* | 12/2023 | Li | H04W 76/40 |
| 2024/0364480 A1* | 10/2024 | Lee | H04L 5/0055 |

FOREIGN PATENT DOCUMENTS

| | | | | |
|---|---|---|---|---|
| CN | 101883325 A | * | 11/2010 | ............ H04W 72/30 |
| CN | 110536445 A | * | 12/2019 | ............ H04L 1/1812 |
| CN | 3 965 496 A1 | * | 4/2020 | ............ H04W 72/04 |
| EP | 3456083 A1 | | 3/2019 | |
| EP | 3965496 A1 | | 3/2022 | |
| JP | WO 2022/080362 A2 | * | 4/2022 | ................ H04L 1/18 |
| WO | WO 2013/134948 A1 | * | 9/2013 | ............ H04W 72/04 |

OTHER PUBLICATIONS

International Search Report issued in corresponding International Application No. PCT/CN2021/085826, mailed Jun. 25, 2021, 6 pages.
First Office Action issued in related Chinese Application No. 202010266874.7 mailed Apr. 6, 2022, 9 pages.
Huawei, Hisilicon. Uu DL enhancements for V2X, 3GPP TSG-RAN WG1 Meeting #84bis, R1-162124, Apr. 2016, 5 pages.
Office Action issued in related Korean Application No. 10-2022-7029122, mailed Nov. 25, 2024, 19 pages.

* cited by examiner

DOWNLINK DATA RECEIVING METHOD, DOWNLINK DATA SENDING METHOD, AND DEVICE

CROSS-REFERENCE TO RELATED APPLICATIONS

This application is a continuation of International Application No. PCT/CN2021/085826, filed on Apr. 7, 2021, which claims the priority of Chinese Patent Application No. 202010266874.7, filed on Apr. 7, 2020. The entire contents of each of the above-referenced applications are expressly incorporated herein by reference.

TECHNICAL FIELD

Embodiments of the present disclosure relate to the field of communications technologies, and specifically, to a downlink data receiving method, a downlink data sending method, and a device.

BACKGROUND

In the existing Long Term Evolution (LTE) technology, a Multicast and Broadcast Service (MBS) service does not support Hybrid Automatic Repeat Request (HARQ) transmission because the MBS service only supports one-time sending. Therefore, when the MBS service is repeatedly sent, data sent repeatedly for a plurality of times cannot be combined or decoded, resulting in a decrease in a decoding success rate and an increase in a packet loss rate.

SUMMARY

A purpose of embodiments of the present disclosure is to provide a downlink data receiving method, a downlink data sending method, and a device.

According to a first aspect, the embodiments of the present disclosure provide a downlink data receiving method, applied to a terminal, the method including:
  obtaining a hybrid automatic repeat request HARQ process of a multicast and broadcast service MBS service; and
  receiving downlink data of the MBS service according to the HARQ process.

According to a second aspect, the embodiments of the present disclosure further provide a downlink data sending method, applied to a network device, the method including:
  obtaining a HARQ process of an MBS service; and
  sending downlink data of the MBS service according to the HARQ process.

According to a third aspect, the embodiments of the present disclosure further provide a terminal, including:
  a first obtaining module, configured to obtain a HARQ process of an MBS service; and
  a first receiving module, configured to receive downlink data of the MBS service according to the HARQ process.

According to a fourth aspect, the embodiments of the present disclosure further provide a network device, including:
  a second obtaining module, configured to obtain a HARQ process of an MBS service; and
  a first sending module, configured to send downlink data of the MBS service according to the HARQ process.

According to a fifth aspect, the embodiments of the present disclosure further provide a communication device, including: a processor, a memory, and a program stored on the memory and executable on the processor, where the program is executed by the processor to implement the steps of the downlink data receiving method according to the first aspect; or the steps of the downlink data sending method according to the second aspect.

According to a sixth aspect, the embodiments of the present disclosure further provide a computer-readable storage medium, storing a computer program, where when executed by a processor, the computer program implements the steps of the downlink data receiving method according to the first aspect; or the steps of the downlink data sending method according to the second aspect.

In the embodiments of the present disclosure, a specific MBS service can be sent and retransmitted through a corresponding HARQ process, so that a terminal can combine and decode data repeatedly sent by a network side for a plurality of times, thereby improving a decoding success rate and thus improving sending reliability of the specific MBS service.

BRIEF DESCRIPTION OF THE DRAWINGS

Various other advantages and benefits become clear to a person of ordinary skill in the art by reading the following detailed description of implementations. The accompanying drawings are merely intended to show exemplary implementations and are do not intended to constitute a limitation on this application. Throughout the accompanying drawings, the same reference numerals are used to represent the same components. In the accompanying drawings.

DETAILED DESCRIPTION

Figure 1:
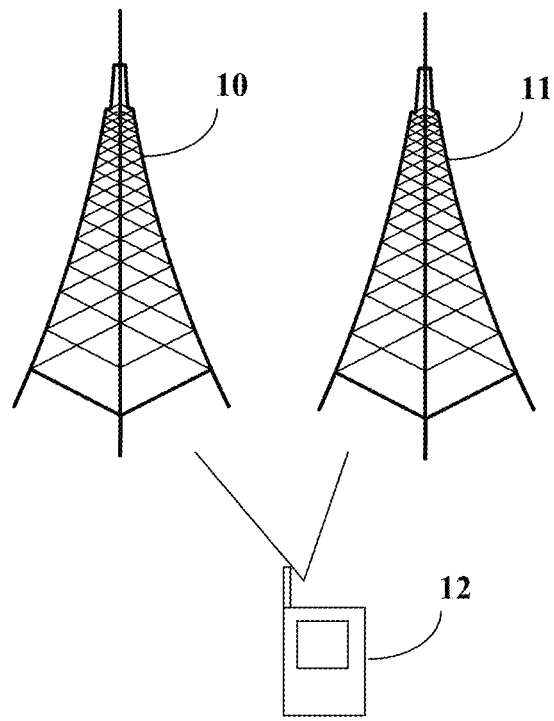
FIG. 1 is a schematic architectural diagram of a wireless communication system according to an embodiment of the present disclosure.

For ease of understanding embodiments of the present disclosure, the following two technical points are described below.

(1) Introduction to a Multimedia Broadcast and Multicast Service (MBMS) or a (MBS):

In an LTE system, the MBMS service can be sent in the following two modes.

MBMS/MBS sending mode 1: It is sent through a Physical Multicast Channel (PMCH) in a subframe of an MBMS Single Frequency Network (MBSFN). Control information is sent through system information (for example, SIB13) and a Multicast Control Channel (MCCH), and data is sent through a Multicast Traffic Channel (MTCH).

MBMS/MBS sending mode 2: It is sent through a Physical Downlink Shared Channel (PDSCH) channel scheduled by a Physical Downlink Control Channel (PDCCH). Control information is sent through system information (for example, SIB20) and a Single Cell Multicast Control Channel (SC-MCCH), and data is sent through a Single Cell Multicast Traffic Channel (SC-MTCH). The SC-MCCH is sent through a PDSCH scheduled by a Single Cell Radio Network Temporary Identity (SC-RNTI) PDCCH, and the SC-MTCH is sent through a PDSCH scheduled by a G-RNTI PDCCH.

(2) Introduction to a Bandwidth Part (BWP):

For a specific cell, a network side can configure at most four BWPs corresponding to different operating frequency information. The network side can instruct an activated BWP through Downlink Control Information (DCI) signaling. For one specific cell, one terminal can only have one activated BWP at one same moment.

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification and claims of this application, the terms "include" and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, the use of "and/or" in the description and the claims means at least one of the connected objects. For example, A and/or B indicates three conditions including A alone, B alone, and both A and B present.

In addition, in the embodiments of the present disclosure, the term "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. In particular, the terms such as "exemplary" and "example" as used herein are intended to present the related concept in an implementation.

Techniques described in this specification are not limited to an LTE/LTE-Advanced (LTE-A) system, and are applicable to various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

The terms "system" and "network" are usually used interchangeably. The CDMA system can implement radio technologies such as CDMA2000, Universal Terrestrial Radio Access (UTRA), and the like. The UTRA includes Wideband Code Division Multiple Access (WCDMA) and other CDMA variants. The TDMA system can implement radio technologies such as Global System for Mobile Communications (GSMs), and the like. The OFDMA system can implement radio technologies such as Ultra Mobile Broadband (UMB), Evolution-UTRA (E-UTRA), IEEE 802.11 (Wi-Fi), IEEE 802.16 (WiMAX), IEEE 802.20, Flash-OFDM, and the like. The UTRA and the E-UTRA are part of a Universal Mobile Telecommunications System (UMTS). The LTE and more advanced LTE (such as LTE-A) are new UMTS releases that use the E-UTRA. The UTRA, E-UTRA, UMTS, LTE, LTE-A, and GSM are described in documents of an organization named "3rd Generation Partnership Project" (3GPP). The CDMA2000 and UMB are described in documents of an organization named "3rd Generation Partnership Project 2" (3GPP2). The techniques described in this specification are applicable to the above-mentioned systems and radio technologies, and also applicable to other systems and radio technologies.

The following describes the embodiments of the present disclosure with reference to the accompanying drawings. A downlink data receiving method, a downlink data sending method, and a device provided in the embodiments of the present disclosure are applicable to a wireless communication system. FIG. 1 is a schematic architectural diagram of a wireless communication system according to an embodiment of the present disclosure. As shown in FIG. 1, the wireless communication system may include: a network device 10, a network device 11, and a terminal 12. The terminal 12 may be denoted as UE 12, and the terminal 12 may communicate (transmit signaling or transmit data) with the network device 10 and the network device 11. In actual application, connections between the foregoing devices may be wireless connections. For convenience of visually showing a connection relationship between the devices, solid lines are used for illustration in FIG. 1.

The network device 10 and the network device 11 provided in this embodiment of the present disclosure may be base stations. The base station may be a commonly used base station, an evolved Node Base station (eNB), or a device such as a network device (for example, a next generation Node Base station (gNB) or a Transmission and Reception Point (TRP)) in a 5G system.

The terminal 12 provided in this embodiment of the present disclosure may be a mobile phone, a tablet computer, a notebook computer, an Ultra-Mobile Personal Computer (UMPC), a netbook, a Personal Digital Assistant (PDA), a Mobile Internet Device (MID), a wearable device, an in-vehicle device, or the like.

Figure 2:
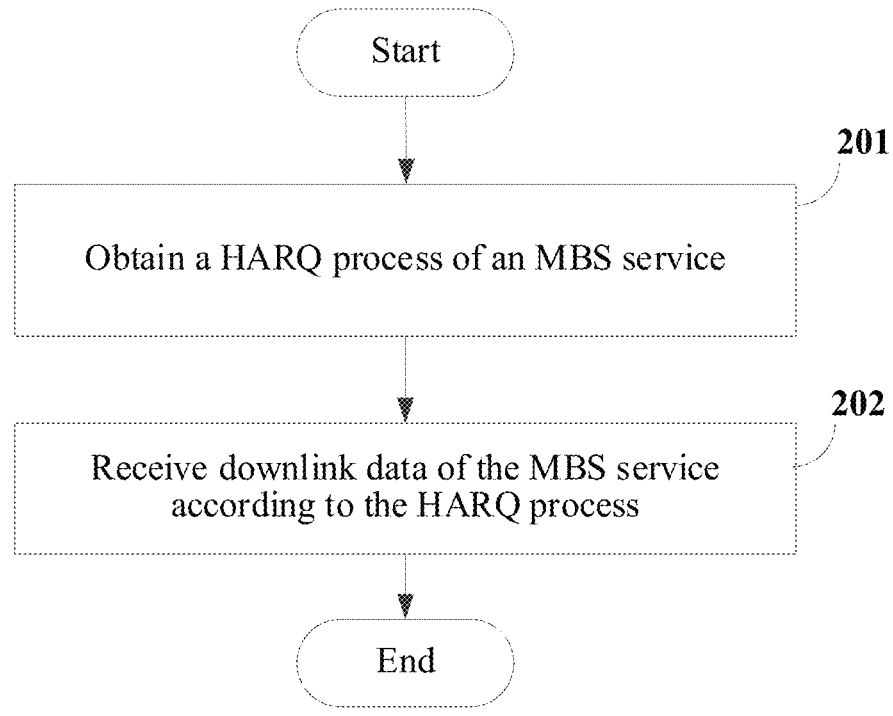
FIG. 2 is a flowchart of a downlink data receiving method according to an embodiment of the present disclosure.

Referring to FIG. 2, an embodiment of the present disclosure provides a downlink data receiving method. The method may be performed by a terminal, and includes step 201 and step 202.

Step 201. Obtain a HARQ process of an MBS service.

It can be understood that the MBS service refers to a partial MBS service or specific MBS service. That is, the HARQ process can be used for transmission of the partial or specific MBS service, such as an MBS service corresponding to a specific cell, an MBS service corresponding to a specific transmission node, an MBS service within a specific frequency range, or the like.

Step 202. Receive downlink data of the MBS service according to the HARQ process.

Exemplarily, when the network side retransmits the sending of the downlink data of the MBS service, UE combines and decodes retransmitted data of the MBS service and previously received data of the MBS service according to the HARQ process. For example, if G-RNTI-1 PDCCH schedules initial transmission of HARQ-1 and C-RNTI PDCCH schedules retransmission of the HARQ-1, the UE combines and decodes initially transmitted data and retransmitted data.

In the embodiments of the present disclosure, the partial or specific MBS service can be received through a specific HARQ process, so that a terminal can combine and decode data repeatedly sent by a network side for a plurality of times, thereby improving a decoding success rate and thus improving sending reliability of the partial or specific MBS service.

In some implementations, the method further includes: receiving indication information, where the indication information instructs the terminal to send or not to send HARQ feedback information according to a downlink data reception condition of the MBS service.

In some implementations, in step 202, sending configuration of the downlink data of the MBS service is obtained, and the downlink data of the MBS service is received according to the HARQ process and the sending configuration.

In some embodiments, the sending configuration of the downlink data of the MBS service includes: including a plurality of sending positions in a downlink data sending period of the MBS service.

For example, each of the plurality of sending positions corresponds to transmission of respective new data, or each of the plurality of sending positions corresponds to transmission of the same data.

In some embodiments, a HARQ sending version of each sending position is agreed by a protocol or configured by a network side. For example, when each of the plurality of sending positions corresponds to the transmission of the same data, the HARQ sending versions of the plurality of sending positions are the same or different.

In the embodiments of the present disclosure, the sending configuration of the downlink data of the MBS service includes: a retransmission mode of the HARQ process of the MBS service or a unicast service.

In some embodiments, the retransmission mode of the HARQ process includes any one of the following:

(1) performing retransmission through a scheduling sending mode corresponding to the MBS service or a unicast service; and (2) performing retransmission through another scheduling sending mode different from an initial transmission scheduling sending mode of the MBS service.

For example, initial transmission of the MBS service is sent through "multicast scheduling sending mode", and retransmission is sent through "unicast scheduling sending mode", both of which adopt the same HARQ process, but different "scheduling sending modes".

In some embodiments, the scheduling sending mode corresponding to the MBS or unicast service includes at least one of the following:

(1) a dynamic scheduling sending mode of the MBS service;

(2) a dynamic scheduling sending mode of the unicast service;

(3) a semi-persistent scheduling sending mode of the MBS service; and (4) a semi-persistent scheduling sending mode of the unicast service.

In some embodiments, in a case of another scheduling sending mode different from the initial transmission scheduling sending mode of the MBS service, an identifier of a scheduling sending mode corresponding to the retransmission is indicated by the network side.

In some implementations, in step 202, the receiving the downlink data of the MBS service includes:

receiving the downlink data of the MBS service according to a downlink data receiving rule.

In some embodiments, the downlink data receiving rule includes one or more of the following:

(1) A priority corresponding to the scheduling sending mode.

A priority corresponding to a scheduling sending mode corresponding to the unicast service is higher than a priority corresponding to a scheduling sending mode corresponding to the multicast service.

(2) A priority corresponding to a logical channel.

For example, if a logical channel priority of the unicast service is higher than that of the multicast service, the UE preferentially receives the multicast service. In another example, if a logical channel priority of a multicast service-1 is higher than that of a multicast service-2, the UE preferentially receives the multicast service-1.

(3) A priority corresponding to a service identifier.

In some embodiments, the service identifier includes at least one of the following: an identifier of the specific MBS service and an identifier of the unicast service.

In some embodiments, the downlink data receiving rule is configured by the network side, agreed by the protocol, or determined by the terminal.

For example, the terminal determines the downlink data receiving rule according to receiving interest of a service. Exemplarily, the UE has higher receiving interest in a TMGI-1 service than a TMGI-2 service. In some embodiments, the UE has higher receiving interest in the MBS service than the unicast service.

In some implementations, in step 201, the obtaining a HARQ process of an MBS service includes:

obtaining corresponding HARQ configuration information received by the MBS service, where the HARQ configuration information includes one or more of the following:

(1) A quantity of HARQ processes available for the MBS service.

In some embodiments, a configuration mode of the number of the HARQ process available for the MBS includes any one of the following: a start HARQ process number and a quantity of available HARQ processes; an end HARQ process number and the quantity of available HARQ processes; an explicitly indicated HARQ process number; and the start HARQ process number and the end HARQ process number.

It may be understood that the HARQ configuration information can be used for the partial or specific MBS service.

In some embodiments, the start HARQ process number and the end HARQ process number are configured by the network side or agreed by the protocol.

(2) A number of the HARQ process available for the MBS service.

In some implementations, the HARQ configuration information of the MBS service includes any one of the following:

(1) The HARQ configuration information of the specific MBS service.

It can be understood that the HARQ configuration information of each MBS service can be independent.

(2) HARQ configuration information of an MBS service corresponding to a specific cell.

(3) HARQ configuration information of an MBS service corresponding to a specific transmission node.

(4) HARQ configuration information of an MBS service corresponding to a specific frequency range.

In some embodiments, the HARQ configuration information has a correspondence with one or more MBS services, and the correspondence is configured by the network side or agreed by the protocol.

In some implementations, a HARQ process pool to which the HARQ process available for the MBS service belongs is the same as a HARQ process pool to which a HARQ process available for a unicast service belongs.

Further, the HARQ process available for the MBS service fails to be used for the initial transmission of the unicast service.

In some other implementations, the HARQ process pool to which the HARQ process available for the MBS service belongs is different from the HARQ process pool to which the HARQ process available for the unicast service belongs.

In the embodiments of the present disclosure, the MBS service can be sent and retransmitted through a specific HARQ process, thereby improving sending reliability of the MBS service.

Figure 3:
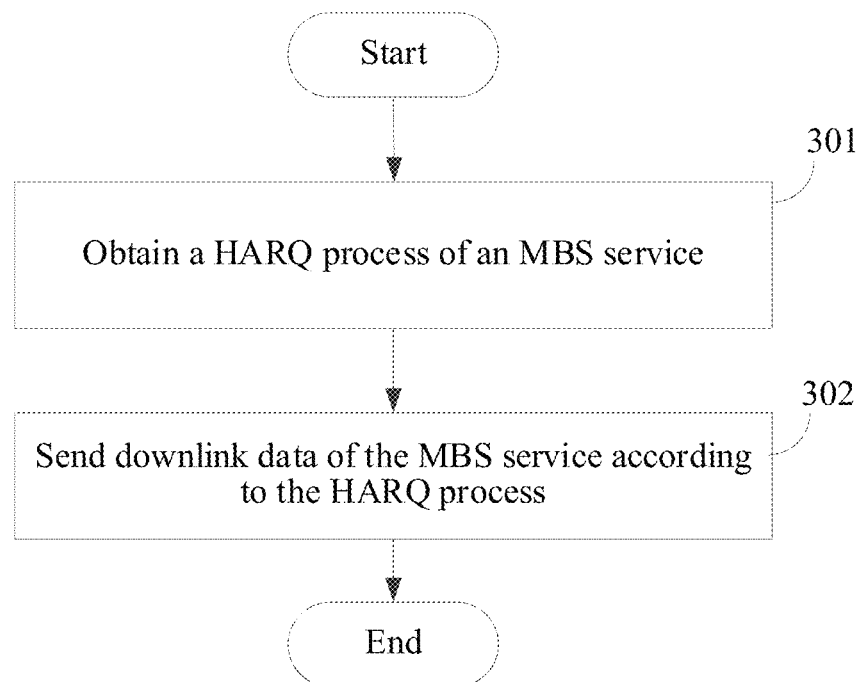
FIG. 3 is a flowchart of a downlink data sending method according to an embodiment of the present disclosure.

Referring to FIG. 3, an embodiment of the present disclosure further provides a downlink data sending method. The method is performed by a network device, and includes step 301 and step 302.

Step 301. Obtain a HARQ process of an MBS service.

It can be understood that the MBS service refers to a partial MBS service or specific MBS service, that is, the HARQ process is applicable to the partial or specific MBS service.

Step 302. Send the downlink data of the MBS service according to the HARQ process.

In some embodiments, sending configuration of the downlink data of the MBS service is obtained; and the downlink data of the MBS service is sent according to the HARQ process and the sending configuration.

In some implementations, the method further includes: sending indication information, where the indication information instructs a terminal to send or not to send HARQ feedback information according to a downlink data reception condition of the MBS service.

In the embodiments of the present disclosure, the MBS service can be sent and retransmitted through a specific HARQ process, thereby improving sending reliability of the MBS service.

For ease of understanding the embodiments of the present disclosure, the following is described with reference to the following examples.

Step 1. The network side configures or the protocol agrees that the MBS service receives corresponding HARQ configuration information.

Step 2. According to the HARQ configuration information, the UE receives downlink data of the corresponding MBS service and sends corresponding feedback information.

In some embodiments, the "MBS service receives corresponding HARQ configuration information" may indicate whether indication information of the HARQ feedback needs to be sent.

For example, a network indicates that the UE needs to send HARQ feedback information for reception of a PDSCH corresponding to an MBS service-1.

In some embodiments, a configuration mode of the "HARQ configuration information" includes any one of the following:

(1) An MBS service corresponding to a specific cell receives corresponding HARQ configuration information.

For example, an MBS service corresponding to a cell-1 receives corresponding HARQ configuration information.

(2) An MBS service corresponding to a specific transmission node receives corresponding HARQ configuration information.

For example, an MBS service corresponding to a transmission node-1 receives corresponding HARQ configuration information.

(3) An MBS service corresponding to a specific frequency range receives corresponding HARQ configuration information.

For example, an MBS service corresponding to a BWP-1 receives corresponding HARQ configuration information.

In addition, the MBS corresponding to the specific cell (or the specific transmission node; or the specific frequency range) receives corresponding HARQ configuration information. Further, the network side configures or the protocol agrees that an MBS corresponding to one or more MBS services receives corresponding HARQ configuration information.

For example, an MBS corresponding to a Temporary Mobile Group Identity (TMGI)-1 receives corresponding HARQ configuration information.

The "identifier of a specific cell" includes one or any combination of more than one of the following:
  (1) cell group identifier;
  for example, a Master Cell Group (MCG) or a Secondary Cell Group (SCG) identifier;
  (2) cell type identifier;
  for example, a Primary Cell (PCell), a Secondary Cell (SCell), a Primary Secondary Cell (PSCell), or a Special Cell (SpCell).
  (3) serving cell identifier;
  for example, Serving cell-1;
  (4) secondary cell identifier;
  for example, SCell-1;
  (5) Physical Cell Identifier (PCI);
  for example, PCI-1.

The "identifier of a specific transmission node" includes one or any combination of more than one of the following:
  (1) transmission node (TRP) identifier;
  for example, TRP-1.
  (2) physical cell identifier;
  for example, PCI-1.
  (3) reference signal identifier;
  for example, Synchronous Signal Block (SSB)-1, and/or, Channel State Information-Reference Signal (CSI-RS)-1;
  (4) port number identifier corresponding to a reference signal;
  for example, port_1;
  (5) resource location identifier of a control channel;
  for example, a Control Resource Set (CORESET) identifier of a Physical Downlink Control Channel (PDCCH), and/or a search space identifier;
  (6) reference signal identifier of a control channel;
  for example, an SSB identifier, and/or a CSI-RS identifier;
  (7) port number identifier corresponding to a reference signal of a control channel;
  for example, port_1.

The "identifier in a specific frequency range" includes one or any combination of more than one of the following:
(1) Bandwidth Part (BWP) identifier;
for example, BWP-1;
(2) frequency;
for example, an Absolute Radio Frequency Channel Number (ARFCN)-1;
(3) bandwidth;
for example, 20 MHz;
(4) frequency start position;
for example, an ARFCN start position (ARFCN-start);
(5) frequency end position;
for example, an ARFCN end position (ARFCN-end);
(6) Physical Resource Block (PRB) identifier;
for example, PRB-1;
(7) PRB quantity identifier;
for example, 10 PRBs.

The "identifier of a specific MBS service" includes one or any combination of more than one of the following:
(1) MBS service information identifier;
for example, TMGI-1;
(2) MBS service logical channel identifier;
for example, Multicast Traffic Channel (MTCH)-1;
(3) MBS bearer identifier;
for example, Data Radio Bearer (DRB)-1, or MBMS point to Multipoint Radio Bearer (MRB)-1;
(4) MBS data flow identifier;
for example, a Quality of Service (QoS) flow-1;
(5) MBS session identifier
for example, PDU session-1;
(6) MBS service area identity;
for example, Service Area Identity (SAI);
(7) MBS service sending area identity;
for example, MBSFN-1, a list of cells sending an MBS service, and an identity of an area for sending an MBS service over an air interface (for example, MBS area 1);
(8) scheduling information identifier of an MBS service;
for example, a GERAN Radio Network Temporary Identifier (G-RNTI)-1, and TMGI-1 of an MBS service sent by UE through a PDSCH scheduled by a PDCCH identified by G-RNTI-1;
(9) data channel identifier of an MBS service;
for example, configuration 1 of a semi-persistent PDSCH, and TMGI-1 of an MBS service sent through downlink Semi-Persistent Scheduling (SPS).

The "HARQ configuration information" includes one or any combination of more than one of the following:
(1) a quantity of HARQ processes available for an MBS;
for example, four HARQ processes;
(2) a number of a HARQ process available for an MBS;
for example, HARQ processes numbered from 0 to 3.

A relationship between the "HARQ process available for an MBS" and the "HARQ process available for a unicast service" includes any one of the following:
Relationship 1: "HARQ process available for an MBS" and "HARQ process available for a unicast service" share the same HARQ process pool.
For example, a total of HARQ process numbers of the UE are "0 to 15" (16 in total), "HARQ processes available for an MBS" are "0 to 7", and "HARQ processes available for a unicast service" are "8 to 15".

In addition, for the relationship 1, the network side configures or the protocol agrees that, the HARQ process of the MBS cannot be used for the initial transmission of the unicast service. For example, the HARQ process of the MBS cannot be used for transmission of new data of a unicast service PDSCH scheduled by a Cell Radio Network Temporary Identifier (C-RNTI) PDCCH.

Relationship 2: "HARQ process available for an MBS" and "HARQ process available for a unicast service" use HARQ process pools independent of each other.
For example, the MBS service of the UE has 8 HARQ processes dedicated to the MBS (for example, HARQ processes numbered from "0 to 7") and the unicast service has 16 HARQ processes dedicated to the unicast (for example, HARQ processes numbered from "0 to 15").

The "identifier of the unicast service" corresponding to the "HARQ process available for the unicast service" includes at least one of the following:
(1) scheduling information identifier of the unicast service;
for example, a C-RNTI-1, that is, DRB-1 of the unicast service sent by the UE through a PDSCH scheduled by a PDCCH identified by C-RNTI-1;
(2) data channel identifier of the unicast service;
for example, configuration 1 of a semi-persistent PDSCH, and DRB-1 of the unicast service sent through downlink SPS;
(3) unicast service bearer type identifier;
for example, DRB-1;
(4) unicast service logical channel identifier;
for example, DTCH-1;
(5) unicast bearer identifier;
for example, DRB-1;
(6) unicast data flow identifier;
for example, QoS flow-1;
(7) unicast session identifier;
for example, PDU Session-1.

A configuration mode of "the number of the HARQ process available for the MBS" includes any one of the following:
(1) A start HARQ process number and a quantity of available HARQ processes.
For example, if a total number of the HARQ processes is 16, "a start HARQ process" is 5, and "a quantity of available HARQ processes" is 5, "the numbers of the HARQ processes available for the MBS" are from "5 to 9".
(2) An explicitly indicated HARQ process number.
For example, the available HARQ processes are such four HARQ processes as "0, 2, 4, and 6".
(3) The start HARQ process number and the end HARQ process number.
For example, if the total number of HARQ processes is 16, the "start HARQ process" is 5, and the end HARQ process number is 9, the "numbers of the HARQ processes available for the MBS" are from "5 to 9", and there are 5 HARQ processes in total.

The "start HARQ process number" or the "ending HARQ process number" is configured by the network side or agreed by the protocol. For example, the protocol agrees that the number starts from "0", or the network configures that the number starts from "5".

In addition, when the MBS service is sent through a semi-persistent data channel, the number of the HARQ process corresponds to a specific time position.
For example, the "start HARQ process" is 5, the "quantity of available HARQ processes" is 5, a HARQ process corresponding to the semi-persistent PDSCH (for example, SPS PDSCH) with a System Frame Number (SFN) of 1 and a slot number of 1 is 5, and a HARQ process corresponding to a next semi-persistent PDSCH is 6.

In addition, when the MBS service is sent through the semi-persistent data channel, the network side configures or the protocol agrees that there may be a plurality of sending positions in a data sending period.

For example, the network side configures that a period of sending the MBS service through the semi-persistent data channel is 10 milliseconds (ms), and there are two sending positions in each period.

The network side configures or the protocol agrees that a sending mode of "a plurality of sending positions in a data sending period" includes any one of the following:

(1) Each sending position corresponds to transmission of respective new data.

For example, the network side configures that the period of sending the MBS service through the semi-persistent data channel is 10 ms, and there are two sending positions in each period. A sending position 1 uses a HARQ process 1 to send new data, and a sending position 2 uses a HARQ process 2 to send new data.

(2) Each sending position corresponds to transmission of the same data (including: new transmission and retransmission).

For example, the network side configures that the period of sending the MBS service through the semi-persistent data channel is 10 ms, and there are two sending positions in each period. The sending position 1 uses the HARQ process 1 to send new data, and the sending position 2 uses the HARQ process 1 to send retransmitted data.

When "a plurality of sending positions in a data sending period" uses "each sending position corresponds to transmission of the same data", the network side configures or the protocol agrees HARQ sending versions of the plurality of sending positions.

For example, the network side configures that the period of sending the MBS service through the semi-persistent data channel is 10 ms, and there are two sending positions in each period. A Redundancy Version (RV) of the sending position 1 that uses the HARQ process 1 to send new data is 0, and an RV of the sending position 2 that uses the HARQ process 1 to send retransmitted data is 2.

In addition, the network side configures or the protocol agrees that the retransmission mode of the HARQ process of the specific service includes any one of the following:

(1) Perform retransmission through a scheduling sending mode corresponding to the specific service.

An example is initial transmission of HARQ process-1 of MBS service scheduled by G-RNTI-1 PDCCH and retransmission of HARQ process-1 of MBS service performed by PDSCH scheduled by G-RNTI-1 PDCCH.

Another example is initial transmission of the HARQ process-1 of the MBS service sent by the MBS semi-persistent PDSCH, and the retransmission performed through the PDSCH scheduled by the G-RNTI-1 PDCCH or retransmission performed through the MBS semi-persistent PDSCH.

(2) Perform retransmission through scheduling sending modes of different services.

An example is initial transmission of the HARQ process-1 of the MBS service scheduled by G-RNTI-1 PDCCH and retransmission of the HARQ process-1 of the MBS service through PDSCH scheduled by C-RNTI-1 PDCCH.

Another example is initial transmission of the HARQ process-1 of the MBS service sent by the MBS semi-persistent PDSCH, and the retransmission performed through the PDSCH scheduled by the C-RNTI-1 PDCCH or retransmission performed through the unicast semi-persistent PDSCH.

The "scheduling sending mode corresponding to the specific service" includes at least one of the following:

(1) Sending of dynamic scheduling of the specific MBS service.

For example, MBS service-1 is sent through PDSCH scheduled by G-RNTI-1 PDCCH.

(2) Sending of dynamic scheduling of the specific unicast service.

For example, the unicast service is sent through C-RNTI or PDSCH scheduled by Configured Scheduling RNTI (CS-RNTI) PDCCH.

(3) Sending of semi-persistent scheduling of the specific MBS service.

For example, MBS service-1 is sent through PDSCH of SPS-1.

(4) Sending of semi-persistent scheduling of the specific unicast service.

For example, the unicast service is sent through PDSCH of SPS-2.

In addition, for "retransmission through scheduling sending modes of different services", the network side indicates a service identifier corresponding to the retransmission. The "service identifier" includes any one of the following:

(1) "identifier of the specific MBS service"
(2) "identifier of the unicast service".

A scenario of "indicating the service identifier corresponding to the retransmission" can be configured by the network or agreed by the protocol as that: the unicast service allows using the HARQ process of the MBS to perform the initial transmission of the unicast service.

In some embodiments, when the network side retransmits the sending of the downlink data of the MBS, the UE combines and decodes retransmitted data of the MBS service and previously received data of the MBS service according to retransmission indication information of the network side.

For example, if G-RNTI-1 PDCCH schedules initial transmission of HARQ-1 and C-RNTI PDCCH schedules retransmission of the HARQ-1, the UE combines and decodes initially transmitted data and retransmitted data.

In addition, if the UE cannot simultaneously receive the downlink data of the MBS (for example, PDSCH scheduled by G-RNTI-1 PDCCH) and the unicast downlink data (for example, PDSCH scheduled by C-RNTI PDCCH), or cannot simultaneously receive downlink data of a plurality of MBSs (for example, PDSCH scheduled by G-RNTI-1 PDCCH and PDSCH scheduled by G-RNTI-2 PDCCH), the UE selects to receive corresponding downlink data according to the following downlink data receiving rules:

Rule 1: Receive downlink data according to a priority order configured by the network or agreed by the protocol.

Rule 2: Receive downlink data according to a priority order indicated by the UE.

Rule 3: Receive downlink data according to a priority order of interest of the UE in receiving services.

For example, the UE has higher receiving interest in a TMGI-1 service than a TMGI-2 service. In some embodiments, the UE has higher receiving interest in the MBS service than the unicast service.

For Rule 1, the priority order includes any one of the following:

(1) A unicast service scheduling sending mode (or a multicast service scheduling sending mode) is preferred.

For example, the PDSCH scheduled by C-RNTI PDCCH takes precedence over the PDSCH scheduled by G-RNTI PDCCH.

(2) The priority order of the logical channel is used for determining a priority order of reception.

For example, if a logical channel priority of the unicast is higher than that of the multicast, the UE receives the multicast preferentially. In another example, if a logical channel priority of multicast service-1 is higher than that of multicast service-2, the UE receives the multicast service-1 preferentially.

For Rule 2, information about the "priority order indicated by the UE" includes any one of the following:

(1) A unicast service scheduling sending mode (or a multicast service scheduling sending mode) is preferred.

For example, the PDSCH scheduled by C-RNTI PDCCH takes precedence over the PDSCH scheduled by G-RNTI PDCCH.

(2) A priority order corresponding to an indicated service identifier.

For example, a priority of a logical channel 1 is higher than that of a logical channel 2. In another example, a priority of TMGI-1 is higher than that of TMGI-2.

The "service identifier" includes at least one of the following:

(1) "identifier of the specific MBS service"; and
(2) "identifier of the unicast service".

In the embodiments of the present disclosure, the MBS service can be sent and retransmitted through a specific HARQ process, thereby improving sending reliability of the MBS service.

Figure 4:
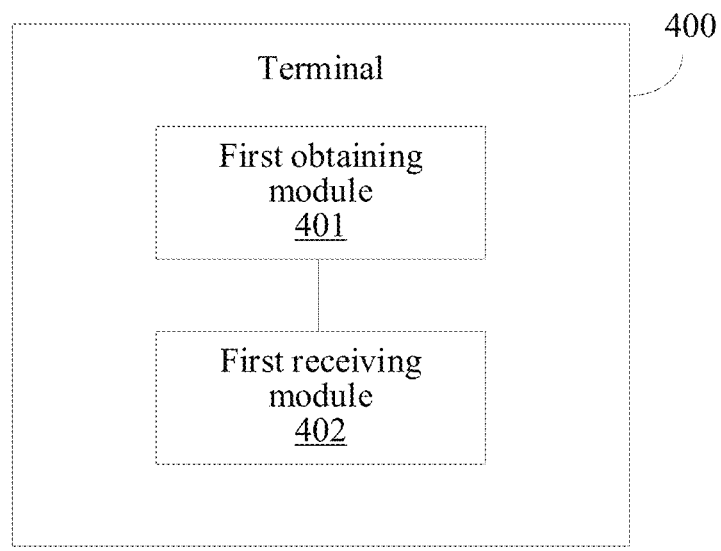
FIG. 4 is a schematic diagram of a terminal according to an embodiment of the present disclosure.

Referring to FIG. 4, an embodiment of the present disclosure further provides a terminal. The terminal 400 includes:

a first obtaining module 401, configured to obtain a HARQ process of an MBS service; and a first receiving module 402, configured to receive downlink data of the MBS service according to the HARQ process.

In some implementations, the terminal 400 further includes: a second receiving module, configured to receive indication information, where the indication information instructs the terminal to send or not to send HARQ feedback information according to a downlink data reception condition of the MBS service.

In some implementations, the first receiving module 402 is further configured to obtain sending configuration of the downlink data of the MBS service, and receive the downlink data of the MBS service according to the HARQ process and the sending configuration.

In some implementations, the sending configuration of the downlink data of the MBS service includes:

including a plurality of sending positions in a downlink data sending period of the MBS service.

In some implementations, each of the plurality of sending positions corresponds to transmission of respective new data; or each of the plurality of sending positions corresponds to transmission of the same data.

In some implementations, a HARQ sending version of each sending position is agreed by a protocol or configured by a network side. For example, when each of the plurality of sending positions corresponds to the transmission of the same data, the HARQ sending versions of the plurality of sending positions are the same or different.

In some implementations, the sending configuration of the downlink data of the MBS service includes: a retransmission mode of the HARQ process of the MBS service.

In some implementations, the retransmission mode includes any one of the following:

(1) performing retransmission through a scheduling sending mode corresponding to the MBS service or a unicast service; and (2) performing retransmission through another scheduling sending mode different from an initial transmission scheduling sending mode of the MBS service.

In some implementations, the scheduling sending mode corresponding to the MBS service includes at least one of the following:

(1) a dynamic scheduling sending mode of the MBS service; and (2) a semi-persistent scheduling sending mode of the MBS service.

The scheduling sending mode corresponding to the unicast service includes at least one of the following:

(1) a dynamic scheduling sending mode of the unicast service; and (2) a semi-persistent scheduling sending mode of the unicast service.

In some implementations, in a case of another scheduling sending mode different from the initial transmission scheduling sending mode of the MBS service, an identifier of a scheduling sending mode corresponding to the retransmission is indicated by the network side.

In some implementations, the receiving the downlink data of the MBS service includes:

receiving the downlink data of the MBS service according to a downlink data receiving rule.

In some implementations, the downlink data receiving rule includes one or more of the following:

(1) A priority corresponding to the scheduling sending mode.

(2) A priority corresponding to a logical channel.

(3) A priority corresponding to a service identifier.

In some implementations, the downlink data receiving rule is configured by the network side, agreed by the protocol, or determined by the terminal.

In some implementations, the obtaining a HARQ process of an MBS service includes:

obtaining corresponding HARQ configuration information received by the MBS service, where the HARQ configuration information includes one or more of the following:

(1) a quantity of HARQ processes available for the MBS service; and (2) a number of the HARQ process available for the MBS service.

In some implementations, a configuration mode of the number of the HARQ process available for the MBS includes any one of the following:

(1) a start HARQ process number and a quantity of available HARQ processes;

(2) an end HARQ process number and the quantity of available HARQ processes;

(3) an explicitly indicated HARQ process number; and (4) the start HARQ process number and the end HARQ process number.

In some implementations, the start HARQ process number and the end HARQ process number are configured by the network side or agreed by the protocol.

In some implementations, the HARQ configuration information of the MBS service includes any one of the following:

(1) the HARQ configuration information of the specific MBS service;

(2) HARQ configuration information of an MBS service corresponding to a specific cell;

(3) HARQ configuration information of an MBS service corresponding to a specific transmission node; and (4) HARQ configuration information of an MBS service corresponding to a specific frequency range.

In some implementations, the HARQ configuration information has a correspondence with one or more MBS services, and the correspondence is configured by the network side or agreed by the protocol.

In some implementations, a HARQ process pool to which the HARQ process available for the MBS service belongs is the same as a HARQ process pool to which a HARQ process available for a unicast service belongs.

The HARQ process pool to which the HARQ process available for the MBS service belongs is different from the HARQ process pool to which the HARQ process available for the unicast service belongs.

In some implementations, in a case that the HARQ process pool to which the HARQ process available for the MBS service belongs is the same as the HARQ process pool to which the HARQ process available for the unicast service belongs, the HARQ process available for the MBS service fails to be used for initial transmission of the unicast service.

The terminal provided in this embodiment of the present disclosure may perform the foregoing method embodiment shown in FIG. 2. Their implementation principles and technical effects are similar. Details are not described in this embodiment again.

Figure 5:
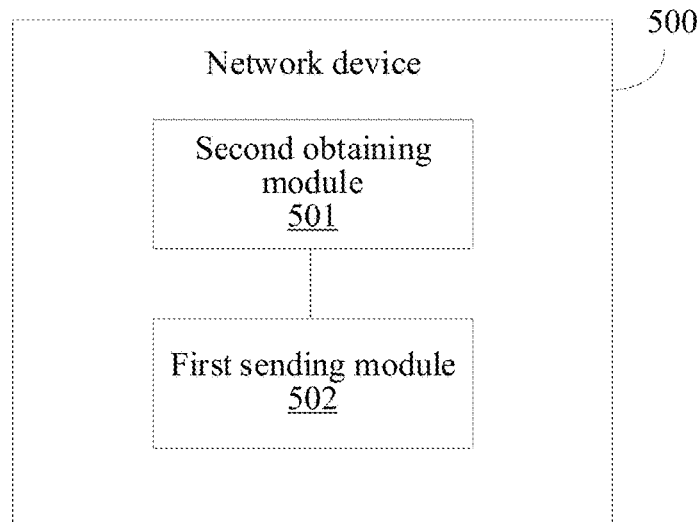
FIG. 5 is a schematic diagram of a network device according to an embodiment of the present disclosure.

Referring to FIG. 5, an embodiment of the present disclosure further provides a network device. The network device 500 includes:

a second obtaining module 501, configured to obtain a HARQ process of an MBS service; and a first sending module 502, configured to send downlink data of the MBS service according to the HARQ process.

In some implementations, the network device 500 further includes:

a second sending module, configured to send indication information, where the indication information instructs a terminal to send or not to send HARQ feedback information according to a downlink data reception condition of the MBS service.

In some implementations, the first sending module 501 is further configured to obtain sending configuration of the downlink data of the MBS service, and send the downlink data of the MBS service according to the HARQ process and the sending configuration.

The network device provided in this embodiment of the present disclosure may perform the foregoing method embodiment shown in FIG. 3. Their implementation principles and technical effects are similar. Details are not described in this embodiment again.

Figure 6:
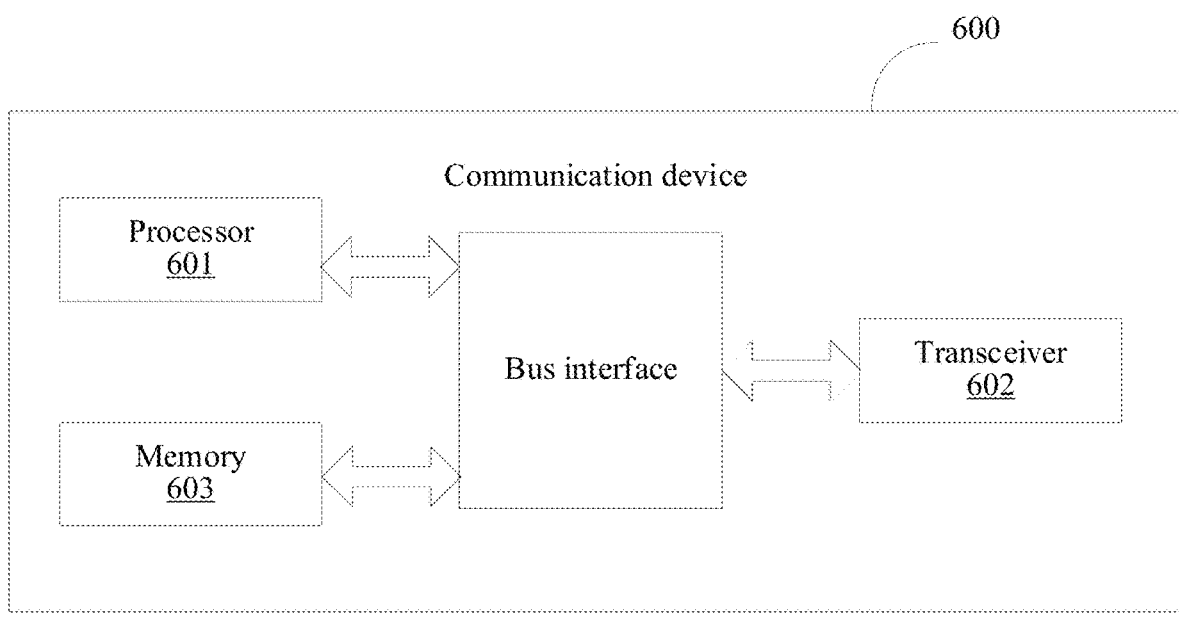
FIG. 6 is a schematic diagram of a communication device according to an embodiment of the present disclosure.

FIG. 6 is a structural diagram of a communication device according to an embodiment of the present disclosure. As shown in FIG. 6, the communication device 600 includes: a processor 601, a transceiver 602, a memory 603, and a bus interface.

In an embodiment of the present disclosure, the communication device 600 further includes: a computer program stored in the memory 603 and executable on the processor 601, the computer program, when executed by the processor 601, implementing steps in the embodiment shown in FIG. 2 or FIG. 3:

In FIG. 6, a bus architecture may include any quantity of interconnected buses and bridges, and connects together circuits that are of one or more processors represented by the processor 601 and of a memory represented by the memory 603. The bus architecture may further connect various other circuits for example, a peripheral device, a voltage stabilizer, and a power management circuit. These are known in the art, and therefore are not further described in this specification. The bus interface provides an interface. The transceiver 602 may be a plurality of components, including a transmitter and a receiver, and providing units for communicating with various other apparatuses on a transmission medium. It can be understood that the transceiver 602 is an optional component.

The processor 601 is responsible for the management of the bus architecture and normal processing, and the memory 603 may store data used when the processor 601 performs an operation.

The communication device provided in this embodiment of the present disclosure may perform the foregoing method embodiment shown in FIG. 2 or FIG. 3. Their implementation principles and technical effects are similar. Details are not described in this embodiment again.

Steps of the methods or algorithms described with reference to the content disclosed in the present disclosure may be implemented by hardware, or may be implemented by a processor executing a software instruction. The software instruction may include a corresponding software module. The software module may be stored in a Random Access Memory (RAM), a flash memory, a Read Only Memory (ROM), an Erasable Programmable Read Only Memory (Erasable PROM, EPROM), an Electrically EPROM (EEPROM), a register, a hard disk, a mobile hard disk, a compact disc read-only memory, or a storage medium in any other forms well-known in the art. For example, a storage medium is coupled to a processor, so that the processor can read information from the storage medium or write information into the storage medium. The storage medium may be a component of the processor. The processor and the storage medium may be located in an Application-Specific Integrated Circuit (ASIC). In addition, the ASIC may be located in a core network interface device. The processor and the storage medium may exist in the core network interface device as discrete components.

A person skilled in the art should be aware of that in the one or more examples, the functions described in the present disclosure may be implemented by hardware, software, firmware, or a combination of the above. When implemented by using software, the functions can be stored in a computer-readable medium or can be used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or dedicated computer.

The foregoing implementations further describe the objectives, and technical solutions of the present disclosure. It should be appreciated that the foregoing descriptions are merely implementations of the present disclosure, but are not intended to limit the protection scope of the present disclosure. Any modification, equivalent replacement, or improvement made based on the technical solutions of the present disclosure should fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Obviously, a person skilled in the art can make various modifications and variations to embodiments of the present disclosure without departing from the spirit and scope of the present disclosure. The present disclosure is intended to cover these modifications and variations in the embodiments of the present disclosure provided that they fall within the scope of protection defined by the following claims and their equivalent technologies.

What is claimed is:

1. A downlink data receiving method, performed by a terminal, comprising:
   obtaining a Hybrid Automatic Repeat Request (HARQ) process of a Multicast and Broadcast Service (MBS) service; and
   receiving downlink data of the MBS service according to the HARQ process,
   wherein receiving the downlink data of the MBS service according to the HARQ process comprises:
      obtaining a sending configuration of the downlink data of the MBS service; and
      receiving the downlink data of the MBS service according to the HARQ process and the sending configuration;
   wherein the sending configuration of the downlink data of the MBS service comprises a retransmission mode of the HARQ process of the MBS service;
   wherein the retransmission mode comprises any one of the following:
      performing retransmission through a scheduling sending mode corresponding to the MBS service or a unicast service; or
      performing retransmission through another scheduling sending mode different from an initial transmission scheduling sending mode of the MBS service; and
   wherein the scheduling sending mode corresponding to the MBS service comprises at least one of the following:
      a dynamic scheduling sending mode of the MBS service; or
      a semi-persistent scheduling sending mode of the MBS service; and
   wherein the scheduling sending mode corresponding to the unicast service comprises at least one of the following:
      a dynamic scheduling sending mode of the unicast service: or
      a semi-persistent scheduling sending mode of the unicast service.

2. The downlink data receiving method according to claim 1, further comprising:
   receiving indication information, wherein the indication information instructs the terminal to send or not to send HARQ feedback information according to a downlink data reception condition of the MBS service, or the indication information is configured to indicate whether the HARQ feedback needs to be sent.

3. The downlink data receiving method according to claim 1, wherein the sending configuration of the downlink data of the MBS service comprises:
   a plurality of sending positions in a downlink data sending period of the MBS service; or
   information indicating a quantity of sending positions in each downlink data sending period.

4. The downlink data receiving method according to claim 3, wherein each of the plurality of sending positions corresponds to transmission of respective new data;
   or
   each of the plurality of sending positions corresponds to transmission of the same data.

5. The downlink data receiving method according to claim 4, wherein a HARQ sending version of each sending position is agreed by a protocol or configured by a network side.

6. The downlink data receiving method according to claim 1, wherein the receiving downlink data of the MBS service comprises:
   receiving the downlink data of the MBS service according to a downlink data receiving rule.

7. The downlink data receiving method according to claim 6, wherein the downlink data receiving rule comprises one or more of the following:
   a priority corresponding to the scheduling sending mode;
   a priority corresponding to a logical channel; or
   a priority corresponding to a service identifier,
   wherein the downlink data receiving rule is configured by a network side, agreed by a protocol, or determined by the terminal.

8. The downlink data receiving method according to claim 1, wherein the obtaining a HARQ process of an MBS service comprises:

obtaining corresponding HARQ configuration information received by the MBS service, wherein the HARQ configuration information comprises one or more of the following:
a quantity of HARQ processes available for the MBS service; or
at least one process number of the HARQ process available for the MBS service.

9. The downlink data receiving method according to claim 8, wherein a configuration mode of the at least one process number of the HARQ process available for the MBS comprises any one of the following:
a start HARQ process number and a quantity of available HARQ processes;
an end HARQ process number and the quantity of available HARQ processes;
an explicitly indicated HARQ process number; or
the start HARQ process number and the end HARQ process number.

10. The downlink data receiving method according to claim 9, wherein the start HARQ process number and the end HARQ process number are configured by a network side or agreed by a protocol.

11. The downlink data receiving method according to claim 8, wherein the HARQ configuration information of the MBS service comprises any one of the following:
HARQ configuration information of a specific MBS service;
HARQ configuration information of an MBS service corresponding to a specific cell;
HARQ configuration information of an MBS service corresponding to a specific transmission node; or
HARQ configuration information of an MBS service corresponding to a specific frequency range.

12. The downlink data receiving method according to claim 8, wherein a HARQ process pool to which the HARQ process available for the MBS service belongs is the same as a HARQ process pool to which a HARQ process available for a unicast service belongs;
or
the HARQ process pool to which the HARQ process available for the MBS service belongs is different from the HARQ process pool to which the HARQ process available for the unicast service belongs.

13. The downlink data receiving method according to claim 1, wherein the other scheduling sending mode different from the initial transmission scheduling sending mode of the MBS service comprises the scheduling sending mode of the unicast service.

14. A downlink data sending method, performed by a network device, comprising:
obtaining a Hybrid Automatic Repeat Request (HARQ) process of a Multicast and Broadcast Service (MBS) service; and
sending downlink data of the MBS service according to the HARQ process,
wherein sending the downlink data of the MBS service according to the HARQ process comprises:
obtaining a sending configuration of the downlink data of the MBS service; and
sending the downlink data of the MBS service according to the HARQ process and the sending configuration;
wherein the sending configuration of the downlink data of the MBS service comprises a retransmission mode of the HARQ process of the MBS service;
wherein the retransmission mode comprises any one of the following:
performing retransmission through a scheduling sending mode corresponding to the MBS service or a unicast service; or
performing retransmission through another scheduling sending mode different from an initial transmission scheduling sending mode of the MBS service; and
wherein the scheduling sending mode corresponding to the MBS service comprises at least one of the following:
a dynamic scheduling sending mode of the MBS service; or
a semi-persistent scheduling sending mode of the MBS service; and
wherein the scheduling sending mode corresponding to the unicast service comprises at least one of the following:
a dynamic scheduling sending mode of the unicast service, or
a semi-persistent scheduling sending mode of the unicast service.

15. The downlink data sending method according to claim 14, further comprising:
sending indication information, wherein the indication information instructs a terminal to send or not to send HARQ feedback information according to a downlink data reception condition of the MBS service.

16. A terminal, comprising: a memory having a computer program stored thereon; and a processor, wherein the computer program, when executed by the processor, causes the processor to perform operations comprising:
obtaining a Hybrid Automatic Repeat Request (HARQ) process of a Multicast and Broadcast Service (MBS) service; and
receiving downlink data of the MBS service according to the HARQ process,
wherein receiving the downlink data of the MBS service according to the HARQ process comprises:
obtaining a sending configuration of the downlink data of the MBS service; and
receiving the downlink data of the MBS service according to the HARQ process and the sending configuration:
wherein the sending configuration of the downlink data of the MBS service comprises a retransmission mode of the HARQ process of the MBS service;
wherein the retransmission mode comprises any one of the following:
performing retransmission through a scheduling sending mode corresponding to the MBS service or a unicast service; or
performing retransmission through another scheduling sending mode different from an initial transmission scheduling sending mode of the MBS service; and
wherein the scheduling sending mode corresponding to the MBS service comprises at least one of the following:
a dynamic scheduling sending mode of the MBS service; or
a semi-persistent scheduling sending mode of the MBS service; and
wherein the scheduling sending mode corresponding to the unicast service comprises at least one of the following:
a dynamic scheduling sending mode of the unicast service; or a semi-persistent scheduling sending mode of the unicast service.

17. The terminal according to claim 16, wherein the operations further comprise: receiving indication information, wherein the indication information instructs the terminal to send or not to send HARQ feedback information according to a downlink data reception condition of the MBS service.

18. The terminal according to claim 16, wherein the sending configuration of the downlink data of the MBS service comprises:
   a plurality of sending positions in a downlink data sending period of the MBS service; or
   information indicating a quantity of sending positions in each downlink data sending period.

19. The terminal according to claim 18, wherein each of the plurality of sending positions corresponds to transmission of respective new data;
   or
   each of the plurality of sending positions corresponds to transmission of the same data.

20. The terminal according to claim 19, wherein a HARQ sending version of each sending position is agreed by a protocol or configured by a network side.

* * * * *